April 29, 1952     V. J. RUNNOE     2,594,500
BROILING UTENSIL
Filed May 18, 1949
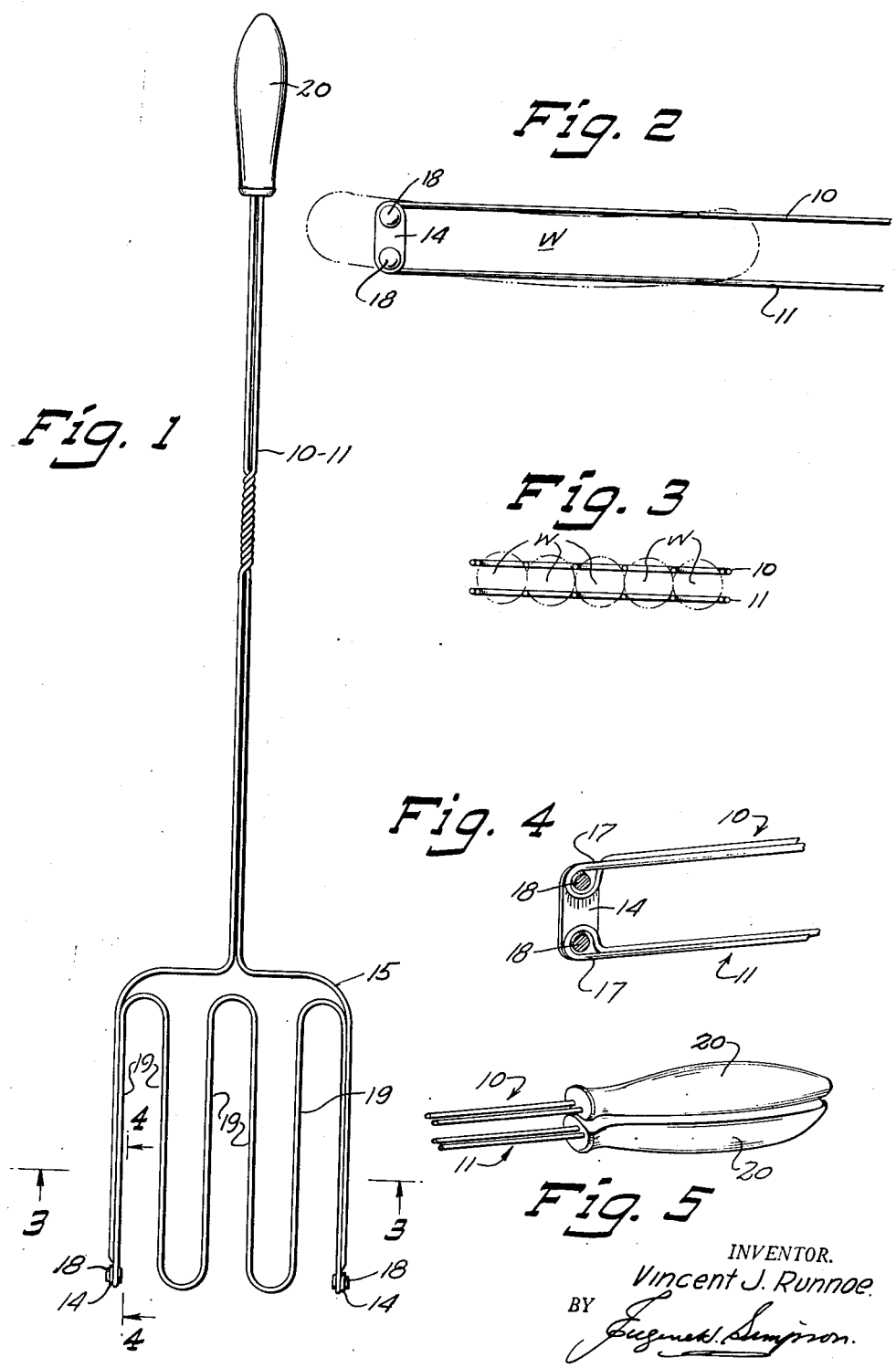

Patented Apr. 29, 1952  2,594,500

UNITED STATES PATENT OFFICE 2,594,500

BROILING UTENSIL

Vincent J. Runnoe, Beaver Dam, Wis.

Application May 18, 1949, Serial No. 93,887

1 Claim. (Cl. 99—441)

This invention relates to broilers and more particularly to a hand broiler adapted to hold and broil wieners over an open fire.

Wiener roasters or broilers heretofore made usually have been provided with prongs on which the wiener was impaled. Such devices cause a loss of flavor and moisture in the cooked product and hence are objectionable.

Other wiener broilers have been made to hold a plurality of wieners at once, but in such broilers the wieners were held as a group, and while one or two of the wieners were held securely other wieners were insecurely held and sometimes were dropped into the fire during the time the broiler was turned.

It is an object of the present invention to provide a wiener broiler which will hold a plurality of wieners without puncturing the skins thereof.

Another object is to provide a wiener roaster which will hold a plurality of wieners in which each of the wieners is held with substantially equal security.

A further object is to provide a wiener roaster which will prevent the wieners from falling out accidentally.

Other objects will become apparent from the following specification, which, when taken in conjunction with the accompanying drawings, illustrates a preferred form of the invention.

In the drawings:

Fig. 1 is a plan view of a wiener broiler embodying the invention;

Fig. 2 is a side view of the broiler end of the device showing a wiener (in broken line) secured therein;

Fig. 3 is a cross-section taken on the line 3—3 of Fig. 1, looking in the direction of the arrows, and showing in broken lines a plurality of wieners in place in the roaster;

Fig. 4 is a view taken on the line 4—4 of Fig. 1 looking in the direction of the arrows; and Fig. 5 is a perspective view of the handle end of the broiler.

Referring to the drawings, the broiler comprises two identical elements, generally designated 10 and 11, connected at their opposite sides by a pair of links 14—14.

Each of the broiler elements 10 and 11 comprises a continuous wire provided with a U-shaped end section 15. At the open end of the U-shaped section 15 the wire is bent back upon itself to form an eye 17 to accommodate a rivet 18 or other securing means which pivotally connects the broiler element 10—11 to the link 14. Between the sides of the U-shaped section the wire is bent in a plurality of parallel loops 19 all formed in the plane of the U and having sufficient distance between the parallel sides of the loops to receive and retain wieners W, in the manner shown in Figs. 2 and 3.

The opposite ends of the wire forming each element 10 and 11 are secured in handles 20—20 which may be substantially half round as shown, so that the two handles constituting the ends for the two elements form a substantially round handle.

The link 14 connects the eyes 17 of the elements through the rivets 18 thus spacing the outer ends of the elements 10 and 11 from each other and permitting uniform pressure on all wieners.

*Operation*

In operation, the elements 10 and 11 are separated by rotating the elements about the pivots 18, and the wieners placed in the broiler longitudinally, as shown in Figs. 2 and 3, a wiener being received in each of the loops 19. The elements 10 and 11 are then closed over the wieners to clamp them in position, the two handles at that time being pressed together to form a single round handle.

The broiler may then be held over an open fire and the wieners cooked.

It will be realized that the hereinbefore described form of the invention is to be considered merely as a preferred embodiment thereof and that various changes in size, shape, and arrangement of parts may be made without departing from the spirit of the invention or the scope of the subjoined claim.

That which is claimed as new and is desired to be secured by United States Letters Patent is:

A wiener broiler of the character described comprising, a pair of handles, a pair of substantially U-shaped elements formed one on the end of each of said handles, a pair of eyes formed in the opposite ends of each U-shaped member, a pair of links one at each end of said elements, pivotal members received in each of the said eyes and in the links to pivotally connect the links to each of the U-shaped elements, and a plurality of parallel loops extending from each eye carried by the U-shaped elements between the parallel legs thereof to hold a plurality of wieners individually parallel to said handles, said handles being adapted to clamp the wieners in place between the elements.

VINCENT J. RUNNOE.

REFERENCES CITED

The following references are of record in the file of this patent:

UNITED STATES PATENTS

| Number | Name | Date |
|---|---|---|
| 177,132 | Knapp | May 9, 1876 |
| 634,224 | Walton | Oct. 3, 1899 |
| 1,945,165 | Smith | Jan. 30, 1934 |
| 2,136,658 | Westberg et al. | Nov. 15, 1938 |

FOREIGN PATENTS

| Number | Country | Date |
|---|---|---|
| 74 | Sweden | Apr. 8, 1885 |